United States Patent
Kurian

(10) Patent No.: US 10,700,867 B2
(45) Date of Patent: Jun. 30, 2020

(54) INTERNET OF THINGS ("IOT") MULTI-LAYERED EMBEDDED HANDSHAKE

(71) Applicant: Bank of America Corporation, Charlotte, NC (US)

(72) Inventor: Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 212 days.

(21) Appl. No.: 15/916,395

(22) Filed: Mar. 9, 2018

(65) Prior Publication Data

US 2019/0280867 A1 Sep. 12, 2019

(51) Int. Cl.
| | |
|---|---|
| H04L 9/32 | (2006.01) |
| H04L 9/08 | (2006.01) |
| H04L 29/06 | (2006.01) |
| H04L 12/26 | (2006.01) |
| H04L 29/08 | (2006.01) |

(52) U.S. Cl.
CPC .......... *H04L 9/3213* (2013.01); *H04L 9/0861* (2013.01); *H04L 9/3228* (2013.01); *H04L 43/10* (2013.01); *H04L 63/0464* (2013.01); *H04L 63/10* (2013.01); *H04L 63/20* (2013.01); *H04L 67/12* (2013.01); *H04L 67/10* (2013.01)

(58) Field of Classification Search
CPC .............................. H04L 67/12; H04L 63/0464
See application file for complete search history.

(56) References Cited

U.S. PATENT DOCUMENTS

| | | | | |
|---|---|---|---|---|
| 6,668,282 B1* | 12/2003 | Booth, III | ........... | H04L 41/0681 709/223 |
| 6,976,071 B1* | 12/2005 | Donzis | ................ | H04L 43/0811 709/224 |
| 9,009,230 B1* | 4/2015 | Matthieu | ................ | H04L 69/08 709/204 |

(Continued)

OTHER PUBLICATIONS

"Securing the Internet of Things: A Proposed Framework," https://www.cisco.com/c/en/us/about/security-center/secure-iot-proposed-framework.html, Mar. 16, 2016.

(Continued)

*Primary Examiner* — James R Turchen
(74) *Attorney, Agent, or Firm* — Weiss & Arons LLP; Michael A. Springs, Esq.

(57) ABSTRACT

Methods for securing data transmission are provided. Methods include utilizing a plurality of cross-connect tokens. Methods include receiving a communication line validation communication at a source device. Methods include powering a first passive cross-connect token located at the source device. The first passive cross-connect token may draw power from the communication. The first token may generate a first OTSC ("onetime security code"). The first token may transmit the first OTSC to a second token. The first OTSC may power the second token. The second token may validate the first OTSC, and generate a second OTSC. The second token may transmit the second OTSC to a third token. The third token may be located on a target device. The second OTSC may power the third token. The third token may validate the second OTSC, and transmit, upon validation, a communication line validated communication to the source device.

9 Claims, 4 Drawing Sheets

(56) References Cited

U.S. PATENT DOCUMENTS

| | | |
|---|---|---|
| 9,319,404 B2 | 4/2016 | Svigals |
| 9,485,231 B1 | 11/2016 | Reese |
| 9,565,192 B2 | 2/2017 | Chillappa et al. |
| 9,591,016 B1 | 3/2017 | Palmieri et al. |
| 9,699,659 B2 | 7/2017 | Zehavi et al. |
| 9,699,814 B2 | 7/2017 | Zakaria et al. |
| 9,716,595 B1 | 7/2017 | Kravitz et al. |
| 9,729,528 B2 | 8/2017 | Zakaria et al. |
| 9,825,921 B2 | 11/2017 | Reese |
| 9,854,445 B1* | 12/2017 | Gu ................. H04W 12/08 |
| 9,875,510 B1 | 1/2018 | Kasper |
| 10,251,053 B1 | 4/2019 | Paczkowski |
| 2009/0245261 A1* | 10/2009 | Khan ............... H04L 12/4641 |
| | | 370/395.53 |
| 2014/0244768 A1* | 8/2014 | Shuman ............. G06Q 50/01 |
| | | 709/206 |
| 2015/0128199 A1* | 5/2015 | Kuo ............... H04L 12/2818 |
| | | 725/110 |
| 2015/0264124 A1* | 9/2015 | Kuo ................ G06F 1/266 |
| | | 709/204 |
| 2016/0087933 A1* | 3/2016 | Johnson ............. H04L 41/08 |
| | | 709/245 |
| 2016/0173495 A1 | 6/2016 | Joo |
| 2016/0248746 A1 | 8/2016 | James et al. |
| 2016/0259937 A1 | 9/2016 | Ford et al. |
| 2016/0260095 A1 | 9/2016 | Ford |
| 2016/0277391 A1* | 9/2016 | Choyi ............... H04L 63/062 |
| 2016/0337127 A1 | 11/2016 | Schultz et al. |
| 2016/0345265 A1* | 11/2016 | Lee .................. G01S 19/42 |
| 2016/0366181 A1* | 12/2016 | Smith ............... G06F 21/57 |
| 2017/0163444 A1* | 6/2017 | McLaughlin ........ H04L 63/02 |
| 2017/0235585 A1* | 8/2017 | Gupta ............. G06F 9/45558 |
| | | 718/1 |
| 2017/0289184 A1 | 10/2017 | C et al. |
| 2017/0331887 A1* | 11/2017 | Fishler ............. H04L 63/0428 |
| 2018/0006829 A1* | 1/2018 | Kravitz ............. H04L 9/3268 |
| 2018/0054423 A1* | 2/2018 | Liu ................ H04W 12/0401 |
| 2018/0084085 A1* | 3/2018 | Shanmugasundaram ............... |
| | | H04L 67/2823 |
| 2018/0183889 A1* | 6/2018 | Meriac .............. H04L 67/26 |
| 2018/0253451 A1 | 9/2018 | Callan et al. |
| 2018/0295497 A1* | 10/2018 | Kim ................. H04W 60/04 |
| 2019/0014117 A1* | 1/2019 | Li .................. H04L 63/0807 |
| 2019/0155659 A1* | 5/2019 | Rodriguez Bravo ... H04L 67/42 |
| 2019/0172566 A1 | 6/2019 | Schulman et al. |
| 2019/0258805 A1* | 8/2019 | Elovici ............. G06F 11/261 |
| 2019/0289454 A1 | 9/2019 | Inoue |
| 2019/0349190 A1 | 11/2019 | Smith et al. |

OTHER PUBLICATIONS

"Global Hacker Botnet tops 6 million hijacked devices," http://www.computerweekly.com/news/450427023/Global-hacker-botnet-tops-6-million-hijacked-devices, Sep. 27, 2017.

Conoscenti et al., "Peer to Peer for Privacy and Decentralized in the Internet of Things," 2017, IEEE, pp. 288-290. (Year: 2017).

* cited by examiner

INTERNET OF THINGS ("IOT") MULTI-LAYERED EMBEDDED HANDSHAKE

FIELD OF THE INVENTION

This invention relates to network security. Specifically, this invention relates to security of the intercommunications between devices on a network.

BACKGROUND OF THE INVENTION

The Internet of Things ("IoT") may be loosely characterized as the interaction and communication between various physical objects. The physical objects are typically embedded with computing and communication capabilities.

The physical objects, or IoT devices, may include refrigerators, lights, smartphones, smartwatches, computers, laptops, tablets, sinks, hot water heaters, coffee machines, ovens, vehicles, thermostats and any other suitable objects.

Various communications may be transmitted between the IoT devices. At times, the communications may include sensitive or confidential information. Because IoT devices are interconnected, and may not necessarily be controlled by a central location, it may be difficult for IoT devices to be informed when an IoT device is compromised. In such an environment, secure communications may be transmitted via a compromised device, and the communications themselves may become compromised.

Therefore, a communications system for securing a data transmission path prior to data transmission is desirable.

SUMMARY OF THE DISCLOSURE

A method for securing data transmission is provided. The method may utilize a plurality of cross-connect tokens. For the purposes of this application, a cross-connect token may be understood to mean a hardware and/or software construct that enables communication from the cross-connect token to a second cross-connect token. The second cross-connect token may, in certain embodiments, be a replicate of the cross-connect token. The second cross-connect token may, in other embodiments, be different than the cross-connect token.

A cross-connect token may be embodied on a hardware device, such as a USB drive. The USB drive may be inserted into an IoT device, such as those described in the background of the invention.

The method may include receiving a communication line validation communication at a source device. The method may include powering a first passive (i.e., non-active and/or non-powered) cross-connect token located at the source device. The communication line validation communication may perform the powering.

The method may include generating, following powering the first token, a first onetime security code at the first token. The method may include transmitting the first onetime security code from the first token to a second passive cross-connect token. The second passive cross-connect token may be located within a first IoT device. The method may include powering the second passive cross-connect token using the first onetime security code. The method may include validating the first onetime security code at the second token.

The method may include generating, following validation of the first onetime security code, a second onetime security code at the second token. The method may include transmitting the second onetime security code from the second token to a third passive cross-connect token. The third token may be located within a second IoT device. The method may include powering the third passive cross-connect token using the second onetime security code. The method may include validating the second onetime security code at the third token.

The method may include generating, following validation of the second onetime security code at the third cross-connect token, a third onetime security code at the third token. The method may include transmitting the third onetime security code to a fourth passive cross-connect token. The fourth token may be included in a target device. The method may include powering the fourth token using the third onetime security code. The method may include validating the third onetime security code at the fourth token.

The method may include transmitting a communication line instantiation communication from the target device to the source device. Upon receipt of the communication line instantiation communication at the source device, the source device may transmit a communication to the target device via the first IoT device and the second IoT device.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
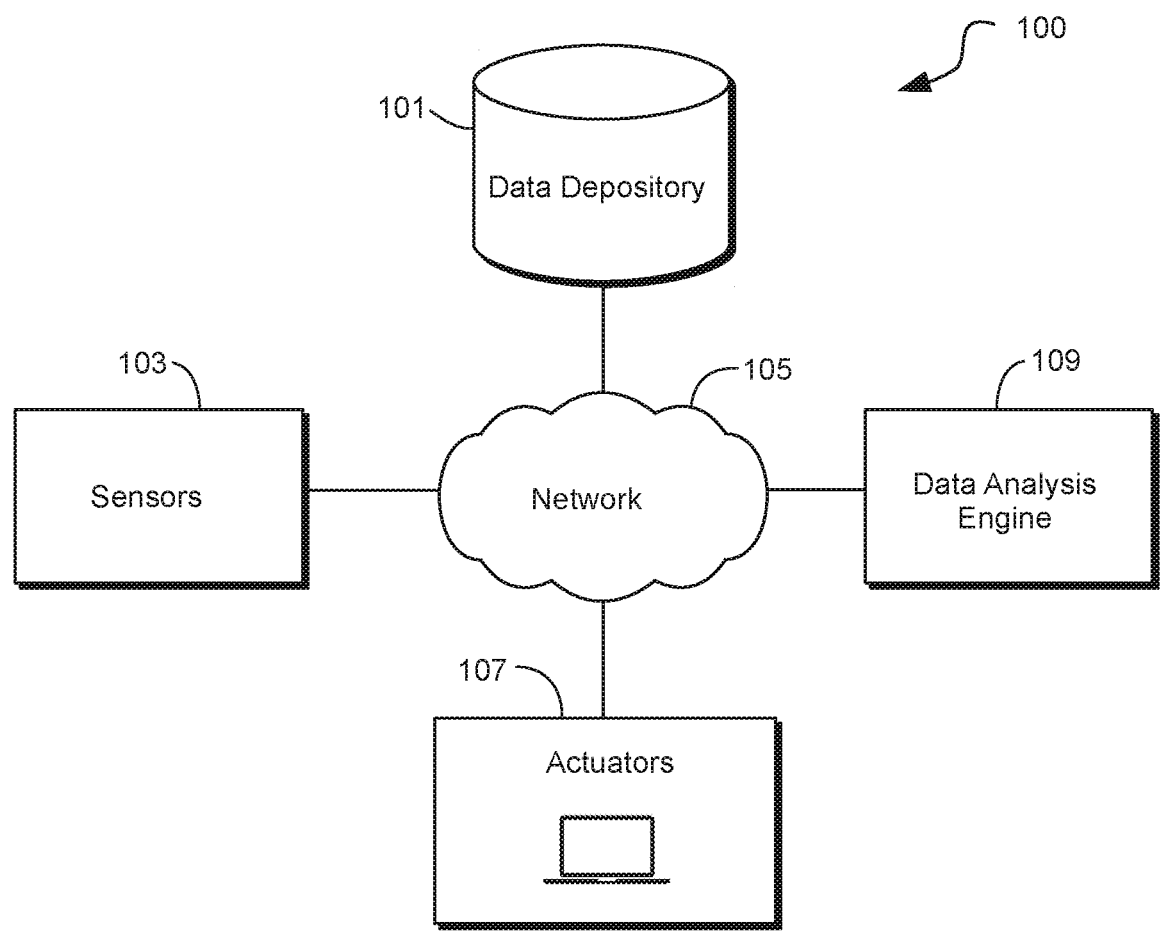
FIG. 1 shows an illustrative diagram in accordance with principles of the invention.

A communications system for securing data transmission is provided. The system may utilize a plurality of cross-connect tokens. The system may include a source device. The system may include a target device.

The system may include a first IoT device. The system may include a second IoT device. The system may include a first cross-connect token. The first cross-connect token may be capable of connecting the source device to the first IoT device. The first cross-connect token may be stored in whole on the source device. The first cross-connect token may be replicated on the first IoT device.

The system may include a second cross-connect token. The second cross-connect token may be capable of connecting the first IoT device to the second IoT device. The second cross-connect token may be stored in whole on the first IoT device. The second cross-connect token may be replicated on the second IoT device.

The system may include a third cross-connect token. The third cross-connect token may be capable of connecting the second IoT device with the target device. The third cross-connect token may be stored in whole on the second IoT device. The third cross-connect token may be replicated on the target device.

The system may be configured to execute a ping test prior to a secure communication transmission from the source device to the target device. The ping test may verify the security of the communication between the source device and the first IoT device, the communication between the first IoT device and the second IoT device and the communication between the second IoT device and the target device.

The ping test may initiate communication between the source device and the first IoT device. The communication may be initiated via a matched connection between the first cross-connect token stored in whole on the source device, and replicated on the first IoT device.

The ping test may also initiate communication between the first IoT device and the second IoT device. The communication may be initiated via a matched connection between the second cross-connect token stored in whole on the first IoT device, and replicated on the second IoT device.

The ping test may also initiate communication between the second IoT device and the target device. The communication may be initiated via a matched connection between the third cross-connect token stored in whole on the second IoT device, and replicated on the target device.

In response to verification of the security of the communications, the source device may be configured to transmit the communication to the target device via the first IoT device and the second IoT device.

When the communication is substantially completely transmitted from the source device to the first IoT device, the matched connection between the first cross-connect token on the source device and the first cross-connect token on the first IoT device may be terminated.

When the communication is substantially completely transmitted from the first IoT device to the second IoT device, the matched connection between the second cross-connect token on the first IoT device and the second cross-connect token on the second IoT device is terminated.

When the communication is substantially completely transmitted from the second IoT device to the target device, the matched connection between the third cross-connect token on the second IoT device and the third cross-connect token on the target device is terminated.

The communication may include a security parameter. At times, the security parameter may be determined to be greater than a security threshold. The security threshold may relate to susceptibility of the communication to becoming compromised. When the security parameter is greater than the security threshold, the system may halt the communication transmission and terminate the matched connections. The security threshold may relate to any number factors such as level of encryption, length of the communication and size of the communication. The system may re-execute the ping test and continue the transmission after the termination.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows illustrative system architecture 100. Architecture 100 may represent an internet of things ("IoT"). A differentiator between IoT and conventional networks is a traffic profile. In an IoT, nodes may not have defined or known network positions, communication protocols or security services. Solutions that allow architecture 100 to function seamlessly and leverage such disparate components are disclosed herein.

Architecture 100 may include nodes. Each node may include two or more nodes. FIG. 1 shows exemplary nodes 101, 103, 105, 107 and 109. The architecture includes sensors 103. Sensors 103 may include devices that detect changes in a physical or virtual environment. For example sensors may measure audio, rainfall, temperature or water levels. Sensors may measure electronic network traffic, electronic signals (e.g., input or output) or frequency of user logins from within a predefined geographic area.

Sensors may be any suitable size. For example, sensors may be a few millimeters in size. Sensors may be deployed in a wide variety of locations. For example, sensors may be deployed in military battlefields, industrial plants, in orchards, in clothing, automobiles, smart phones, jewelry or refrigerators. Sensors may be relatively inexpensive and have low energy consumption. Sensors may "sense" one or more stimuli or environmental changes.

Sensors may implement one or more functions. For example, sensors may measure changes in their native environment, capture data related to the measured changes store and communicate the captured data. Sensors may be accessed by other sensors or any other node. Sensors may transmit captured data to another node. Sensors may broadcast captured data to one or more nodes.

Captured data may be transmitted using any suitable transmission method. For example, data captured by a sensor may be extracted by a mobile phone. Sensors may leverage a communication link provided by a mobile phone to communicate captured data to another node.

Each sensor may be a node and each sensor may be assigned a unique identifier. For example, sensors may be identified by one or more radio frequency identification ("RFID") tags. The RFID tag may be stimulated to transmit identity information about the sensor or any other information stored on the RFID tag.

Captured data may be transmitted by the sensor and processed far from the location of the sensor that captured the data. For example, captured data may be transmitted from one node to another node until the captured data reaches data repository 101.

Sensors maybe positioned and capture data from diverse locations. Locations may include geographic locations or virtual locations on electronic networks. Captured data may be transmitted to a location where information is needed for decisioning or consumption, which may not be the same place the data was captured or generated. Data synchronization protocols and caching techniques may be deployed to ensure availability of information at, or delivery to, a desired node. For example, a location where data is captured may not have continuous reliable network connectivity. Accordingly, captured data may be stored locally on the sensor for an amount of time prior to transmission or broadcast to another node.

Contextually, captured data may provide information not only about the physical environment surrounding a sensor, but the capturing of data from multiple sensors may provide data that signifies an event. Sensors may be grouped. Sensors may be grouped based on physical proximity or based on the content (or expected content) of data captured. Sensors may be grouped virtually. Other nodes, such as data analysis engine 109 may create and/or be included in such groups. In some embodiments, the captured data may be organized by data repository 101.

Based on data captured from sensors 103, actuators 107 may respond to a detected event. Based on the capture and analysis of multiple sources of data, actuators 107 may be instructed to take action without human intervention.

Generally, sensors and other nodes that form part of architecture 100 may include a processor circuit. The processor circuit may control overall operation of a node and its associated components. A processor circuit may include hardware, such as one or more integrated circuits that form a chipset. The hardware may include digital or analog logic circuitry configured to perform any suitable operation.

A processor circuit may include one or more of the following components: I/O circuitry, which may include a transmitter device and a receiver device and may interface with fiber optic cable, coaxial cable, telephone lines, wireless devices, PHY layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

Machine-readable memory may be configured to store, in machine-readable data structures: captured data, electronic signatures of biometric features or any other suitable information or data structures. Components of a processor circuit may be coupled together by a system bus, wirelessly or by other interconnections and may be present on one or more circuit boards. In some embodiments, the components may be integrated into a single chip. The chip may be silicon-based.

The node may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor for enabling a node to perform various functions. For example, the non-transitory memory may store software applications used by a node, such as an operating system, application programs, and an associated database. Alternatively, some or all of computer executable instructions of a node may be embodied in hardware or firmware components of the node.

Software application programs, which may be used by a node, may include computer executable instructions for invoking user functionality related to communication, such as email, short message service ("SMS"), and voice input and speech recognition applications. Software application programs may utilize one or more algorithms that request alerts, process received executable instructions, perform power management routines or other suitable tasks.

As shown in FIG. 1, a node may operate in a networked environment. A node may be part of two or more networks. A node may support establishing network connections to one or more remote nodes. Such remote nodes may be sensors, actuators or other computing devices. Nodes may be personal computers or servers. Network connections may include a local area network ("LAN") and a wide area network ("WAN"), and may also include other networks. When used in a LAN networking environment, a node may be connected to the LAN through a network interface or adapter. The communication circuit may include the network interface or adapter.

When used in a WAN networking environment, a node may include a modem or other circuitry for establishing communications over a WAN, such as the Internet. The communication circuit may include the modem.

The existence of any of various well-known protocols such as TCP/IP, Ethernet, FTP, HTTP and the like is presumed, and a node can be operated in a client-server configuration to permit a user to retrieve web pages from a web-based server. Web browsers can be used to display and manipulate data on web pages.

Nodes may include various other components, such as a battery, speaker, and antennas. Network nodes may be portable devices such as a laptop, tablet, smartphone, "smart" devices (e.g., watches, eyeglasses, clothing having embedded electronic circuitry) or any other suitable device for receiving, storing, transmitting and/or displaying relevant information.

A node may include a display constructed using organic light emitting diode ("OLED") technology. OLED technology may enhance functionality of a node. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a Liquid Crystal Display power must be supplied to the entire backlight, even to illuminate just one pixel in the display. In contrast, an OLED display does not necessarily include a backlight. Furthermore, in an OLED display, preferably, only the illuminated pixel draws power.

The power efficiency of OLED technology presents a possibility for designing nodes that provide enhanced security and functionality. Illustrative devices that may be constructed using OLED technology are disclosed in U.S. Pat. No. 9,665,818, which is hereby incorporated by reference herein in its entirety.

A node may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, "smart" devices (e.g., watches, eyeglasses, clothing having embedded electronic circuitry) mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Nodes may utilize computer-executable instructions, such as program modules, being executed by a computer. Generally, program modules include routines, programs, objects, components, data structures, etc. that perform particular tasks or implement particular abstract data types. A node may be operational with distributed computing environments where tasks are performed by remote processing devices that are linked through a communications network. In a distributed computing environment, program modules may be located in both local and remote computer storage media including memory storage devices. Nodes may rely on a network of remote servers hosted on the Internet to store, manage, and process data (e.g., "cloud computing").

Nodes may include a battery. The battery may be a power source for electronic components of the node. For example, the battery may supply power to the display, the communication circuit and the processor circuit. In some embodiments, a node may include a plurality of batteries. Nodes may include solar panels that convert solar energy into electricity that powers one or more components of a node.

Sensors in a single architecture or other grouping may be produced by different manufacturers. Sensors may capture data in different formats. For example, sensors may use different data structures to package captured data. Sensors 103 may utilize different communication protocols to transmit captured data or communicate with other nodes. Despite such operational differences, sensors 103 may operate substantially seamlessly together. Interoperability may allow captured data to be substantially seamlessly captured and interpreted by data analysis engine 109. Based on interpreting the captured data, data analysis engine 109 may issue instructions to actuators 107.

Interoperability may be implemented across any suitable nodes of architecture 100. Interoperability may enable communication between sensors 103 and other nodes. Interoperability may enable architecture 100 to provide services and applications via actuators 107. Interoperability may allow services and content to be provided anywhere, anytime and based on input/output of different nodes.

Data gathering by one or more of sensors 103 may be controlled by one or more other nodes of architecture 100. For example, data analysis engine 109 may control a quantity of data captured by sensors 103. Alternatively, data repository 101 and/or analysis engine 109 may filter or otherwise intelligently process data captured by sensors 103.

Timing of when data is captured by sensors 103 may be controlled by any suitable node on architecture 100. For example, data may be captured in real-time or at pre-defined intervals such as once a day. Data may also be captured in response to a detected environmental status change.

Data analysis engine 109 may filter data captured by sensors 103. Data analysis engine 103 may repackage or reformat captured data. Data conversion may include transformation of low level raw data (possibly from multiple sensors or groups of sensors) into meaningful information for a target audience or for a target analysis.

For example, captured data intended for human consumption or interaction may be converted into a human understandable format. Captured data intended for machine consumption may be converted into a format readable by a particular machine or node.

Data analysis engine 109 may perform pattern recognition to identify correlations and trends in captured data. Data analysis engine 109 may also evaluate a cost of obtaining data. "Costs" may be monetary (e.g., labor costs or infrastructure costs), time-related or related to a level of intrusion needed to obtain desired data. "Costs" may be bandwidth-related.

For example, a communication link may be associated with a fixed bandwidth. The bandwidth may limit an amount of information or a rate of transmission over the communication link.

For example, a sensor may respond slowly to a request from another node if there is a large amount of informational traffic traveling on a communication link shared with other nodes. The large amount of informational traffic may not leave sufficient bandwidth for the transmitting node to timely communicate with the requesting node.

As a further example, a sensor may respond slowly if the sensor transmits a large amount of captured data. The large amount of information transmitted by the sensor, together with other informational traffic traveling on the shared communication link, may be close to, or exceed the bandwidth of the communication link. As a result, sensors may be unable to transmit captured date in a timely manner.

Data travelling within architecture 100 to/from nodes may be routed along multiple communication links until the transmitted information reaches a desired destination node (e.g., data analysis engine 109). Each communication link may service a number of connected nodes and a respective volume of informational traffic.

It may be difficult to ascertain available bandwidth on a particular communication link. It may be difficult to ascertain which communication links are being utilized to transmit information between nodes. Nodes attempting to transmit information over a communication link may not be aware of a number of connected nodes, a volume of traffic on a particular communication link or a bandwidth capacity of a communication link.

Furthermore, a communication link may be controlled by a different entity from an entity responsible for operation of a particular node. The entity responsible for operation of the node may be unable to monitor a number of nodes that share a communication link, a bandwidth capacity of a communication link or a volume of traffic transmitted on a communication link. Despite difficult to predict conditions on a communication link, it would be desirable for a node to timely respond to a request for information or timely receive desired information.

Sensors 103 may belong to, or operated by, different administrative/management domains. Sensors 103 may be operated by different domains without expressly-defined relationships among such domains. The absence of express relationships enables access to data captured by sensors 103 by one or more architectures having one or more features in common with architecture 100. Groups of sensors may include sensors from two or more administrative domains.

Data repository 101 may receive data captured by sensors 103. In some embodiments, data captured by sensors 103 may be transmitted directly to data analysis engine 109. Data stored in repository 101 may be sorted and analyzed by data analysis engine 109. Data stored in data repository 101 may be so voluminous and complex (e.g., structured/unstructured and/or constantly changing) that traditional data processing application software may be inadequate to meaningfully process the data (e.g., "big data"). Data analysis engine 109 may include software applications specially designed to process large volumes of data ("big data analytics").

Based on captured data, data analysis engine 109 may optimize processes, reduce loss (e.g., fraud), improve customer understanding and targeting, increase automation, decrease latency in products and/or services provided by actuators 107 and identify new analytical models that may utilize data captured by sensors 103.

Architecture 100 may include one or more layers of software applications. Software applications may implement a variety of functions and provide varied services to nodes of architecture 100. Software applications running on data analysis engine 109 may submit requests to sensors 103 for retrieval of specific data to achieve a functional goal provided by actuators 107. Software applications may control data captured by sensors 103 or actions taken by actuators 107. Software applications may control a flow of information within architecture 100.

Software applications may be implemented on a node. A node may be an enterprise system or a "cloud" of computing devices. On device applications may be dependent on a specific hardware configuration. Such hardware requirements may preferably be minimal, such as an extension of the OS/firmware of the device. For example, illustrative software applications for sensors may include TinyOS, Linux, Contiki and RIoT.

Software applications may include middleware. Middleware may connect an operating system or database to other software applications. Middleware may configure and manage hardware such as sensors (e.g., to achieve a target functionality). Middleware may be responsible for aggregating data captured by sensors 103 and passing captured data to data repository 101 and/or data analysis engine 109.

Software applications may provide security services that mitigate threats to the integrity of data captured by sensors 103 or architecture 100 generally.

Actuators 107 may respond to data transmitted or processed by other nodes such as data analysis engine 109. Actuators 107 may include devices that modify the physical state of a physical entity. Actuators 107 may include devices that modify a virtual state of information. For example, actuators 107 may move (translate, rotate, etc.) physical objects or activate/deactivate functionalities of more complex ones. An actuator may dim a light bulb, open a door, change a temperature setting, authorize access to an automated-teller-machine ("ATM") and/or any other suitable functionality. Actuators 107 may verify identities, trigger electronic payments, extend credit or debit accounts.

Within an intelligent networked system such as architecture 100, sensors 103 perform the functions of input devices - they serve as, for example, "eyes," collecting information about their environment. In contrast, actuators 107 act as "hands," implementing decisions based on data captured by sensors 103. A single node may include the functions of sensors and actuators.

Actuators 107 may communicate with data analysis engine 109 and sensors 103. Actuators 107 may include an application programming interface ("API") for communicating with other nodes. Actuators 107 may communicate directly with other nodes using machine-to-machine ("M2M") protocols. Illustrative M2M protocols may include MQ Telemetry Transport ("MQTT"). M2M includes communication between two or more objects without requiring direct human intervention. M2M communications may automate decision and communication processes for actuators 107.

In the absence of express relationships between sensors and the devices that access data captured by the sensors traditional approaches for managing trust, security naming, discovery, or other traditional network services may not be applicable or available. Therefore, a communications system for securing data transmission utilizing a plurality of crossconnect tokens is provided. The communications system may verify the security of a transmission hop path prior to transmission of a communication. IoT devices may be secure at one time, but may become compromised at another time due to various circumstances. Therefore, verification prior to communication may ensure that the security of the communications remains substantially constant.

Generally, nodes of architecture 100 may interact and cooperate using one or more interaction paradigms. Exemplary interaction paradigms include client-server and peer-to-peer interactions. Illustrative communication protocols may include HyperText Transfer Protocol ("HTTP"), Simple Object Access Protocol ("SOAP"), REpresentational State Transfer ("REST") Constrained Application Protocol ("CoAP") or SensorML.

As a result of the disparate nature of sensors 103, an architecture, such as architecture 100 incorporating sensors 103 may support a variety of communication protocols. Illustrative supported protocols may include IEEE 802.15.4 ("ZigBee"), IEEE 802.11, 3G and 4G and LTE. For example, ZigBee requires approximately 20 to 60 mW (for 1 mW transmission power, a range of 10 to 100 meters and a data transmission rate of 250 kbit/s).

To conserve energy, a sensor may communicate wirelessly for short periods of time. Utilizing this approach, one or more standard size single cell cylindrical dry battery batteries (e.g., AA size) may provide requisite computing power and wireless communication for many months.

Communication protocols used by nodes (e.g., sensors or actuators) may not have, or may not be capable of having, security capabilities. A security layer or buffer may be implemented by nodes that receive or rely on data captured by insecure sensors. Sensors or other nodes may be dynamically added or removed from an architecture. A security layer or buffer may be modular to scale quickly and meet growth/contraction requirements.

A physical layer may physically link nodes of architecture 100. The function of this physical layer is to provide communication pathways to carry and exchange data and network information between multiple sub-networks and nodes.

Figure 2:
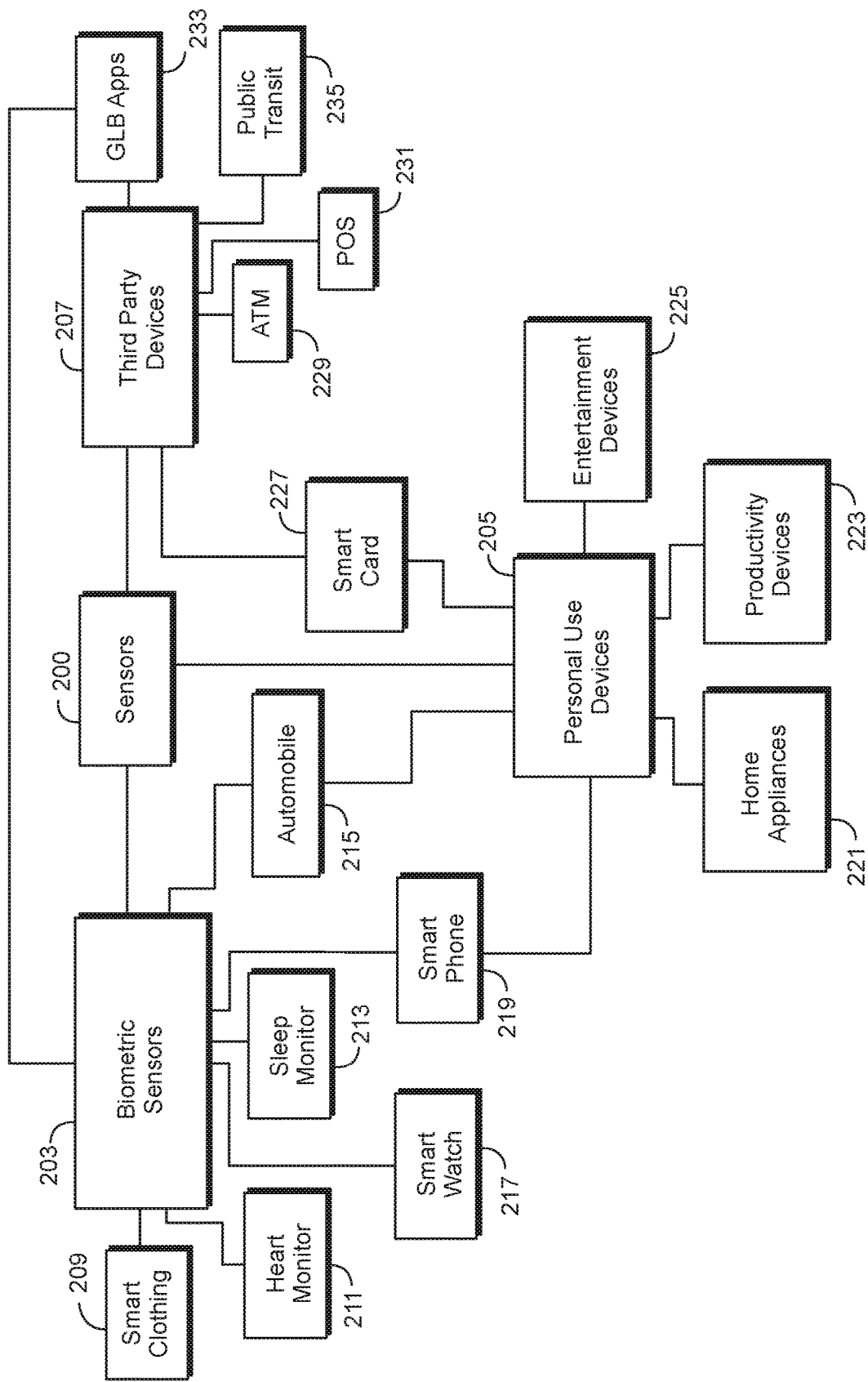
FIG. 2 shows another illustrative diagram in accordance with principles of the invention.

FIG. 2 shows illustrative sensors 200. Sensors 200 may include one or more features of sensors 103 (shown in FIG. 1). Sensors 200 include biometric sensors 203 that sense biometric attributes. For example, biometric sensors may be embedded in "smart" clothing 209 that monitors a wearer's physical condition. Such clothing may capture biometric data, such as pulse rate, temperature, muscle contraction, heart rhythm and physical movement. Smart clothing may be linked to smart phone 219 such as via a Bluetooth® communication link. Smart phone 219 may transmit data captured by smart clothing 209 to one or more other network nodes.

Biometric sensors 203 may include other illustrative sensors such as heart monitor 211, sleep monitor 213, smart watch 219, smart phone 219 and automobile 215.

Sensors 200 may include personal use devices 205. Personal use devices 205 may include sensors embedded in home appliances 221, productivity devices 223 or entertainment devices 225. Productivity devices 223 may include tablets, laptops or other personal computing devices. Entertainment devices may include gaming consoles and the like.

Sensors 200 also include third-party devices 207. Third-party devices may include devices that are not under the direct or exclusive control of a user. A user may interact with third-party devices 207 to obtain a desired service provided by the third-party.

Exemplary third party devices include smart card 227. Smart card 227 may function as a purchasing instrument. Illustrative purchasing instruments may conform to specifications published by the International Organization for Standardization. Such specifications may include: ISO/IEC 7810, ISO/IEC 7811 and ISO/IEC 7816, which are hereby incorporated herein by reference in their entireties. Suitable purchasing instruments may include a credit card, debit card and electronic purchasing devices. Such purchasing instruments may sense a location or frequency of use.

Such purchasing instruments may include "EMV" chips. EMV is a technology that derives its name from the companies (Europay, MasterCard, and Visa) that helped develop the technology. When the credit card and its associated EMV chip are inserted into a specialized card reader (another sensor), the reader powers the EMV chip and the EMV chip generates a new authorization code each time the credit card is used. The EMV chip may capture transaction data such as amounts, location or identity of the chip reader.

Third-party sensors 207 may include ATMs 229 and point-of-sale terminals ("POS") 231. Such devices may also be actuators.

Third-party devices may also include software applications 233. Applications 233 may be used to access services, such as an online banking portal. Such applications may detect biometric features to authorize access to the online banking portal. Third-party devices may include sensors that capture data associated with power consumption (e.g., smart grids), electronic communication traffic, logistics (package movement) or any other suitable environmental condition.

FIG. 200 shows that sensors may categorically overlap. For example, an application used to access an online bank portal may capture a biometric feature (e.g., fingerprint) to authenticate a user.

Each of the sensors shown in FIG. 200 may include different and possibly incompatible hardware. For example, sensors may each have different operating systems (or none at all), processor types and memory. Sensors 200 may be inexpensive, single-function devices with rudimentary network connectivity. Sensors 200 may be positioned in remote and/or inaccessible locations where human intervention or configuration is difficult.

To conserve power, sensors 200 may utilize 16-bit microcontrollers. Such microcontrollers may use less than 400 pW per MIPS ("million instructions per second") and may be capable of operating TCP/IPv6 stacks with 4 kB RAM and 24 kB flash memory. As outlined in proposed Internet standard RFC 4944, which is hereby incorporated by reference in its entirety, IPv6 may be implemented over IEEE 802.15.4 (e.g., ZigBee) based wireless communication standards.

Furthermore, because of potentially disparate features and characteristics of sensors 200, security solutions disclosed herein may be used to verify an authenticity of data transmitted by sensors having disparate hardware and software capabilities.

Figure 3:
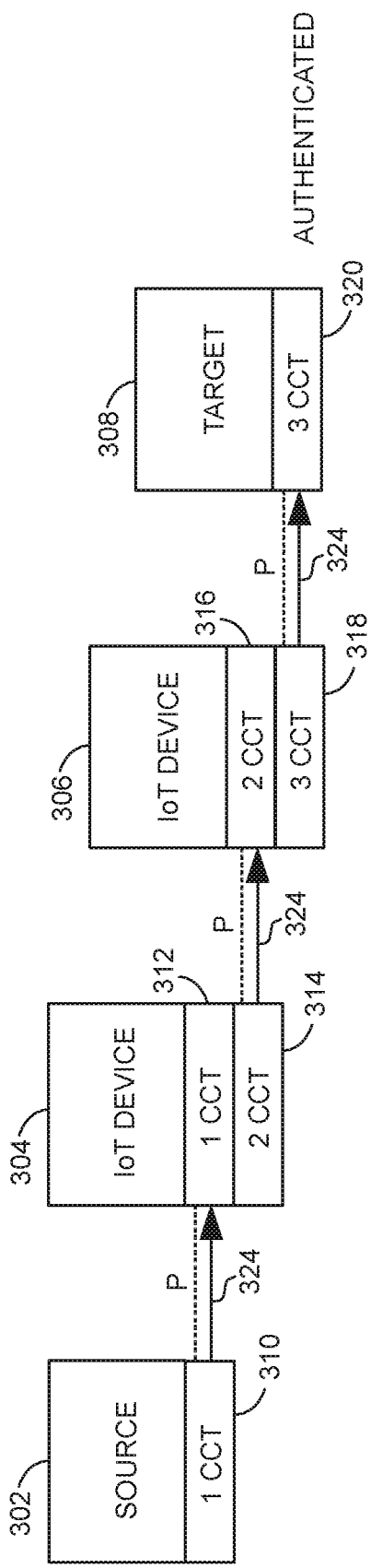
FIG. 3 shows another illustrative diagram in accordance with principles of the invention.

FIG. 3 shows an illustrative diagram. Source device 302 may intend to transmit a secure communication to target device 308. Source device 302 may include data relating to different hop paths that can be used to communicate with target device 308. One option available to source device 302 may be IoT device 304 and IoT device 306.

In order to instantiate a secure communication path between source device 302 and target device 308 via IoT device 304 and IoT device 306, a ping test may be generated. The purpose of the ping test may be twofold. The ping test may instantiate a communication path between source device 302 and target device 308. The ping test may also ensure the security of the communication path.

Source device 302 may include a first cross-connect token, as shown at 310. When a secure communication path is instantiated, first cross-connect token, shown at 310, included in source device 302, may execute a unique handshake with the first cross connect token, shown at 312, included in IoT device 304. The unique handshake may link source device 302 to IoT device 304. The unique handshake may also verify the security of the two handshaking devices. When the handshake between source device 302 and IoT device 304 is successfully executed, a communication line between source device 302 and IoT device 304 may be instantiated.

Upon instantiation of the communication line between source device 302 and IoT device 304, second cross-connect token, shown at 314, included in IoT device 304, may execute a unique handshake with second cross-connect token, shown at 316, included in IoT device 306. The unique handshake may link IoT device 304 to IoT device 306. When the handshake between IoT device 304 and IoT device 306 is successfully executed, a communication line between IoT device 304 and IoT device 306 may be instantiated.

Upon instantiation of the communication line between IoT device 304 and IoT device 306, third cross-connect token, shown at 316, included in IoT device 306, may execute a unique handshake with third cross-connect token, shown at 320, included in target device 308. The unique handshake may link IoT device 306 to target device 308. When the handshake between IoT device 306 and target device 308 is successfully executed, a communication line between IoT device 306 and target device 308 may be instantiated.

Once the communication line between IoT device 306 and target device 308 is instantiated, the ping test may be successful. Target device 308 may transmit a message to source device 302, via the instantiated communication lines. The message may include information relating to the successful ping test.

Upon successful ping test completion, communication 324 may be transmitted from source device 302 to target device 308. It should be appreciated that, after a successful transmission of communication 324, the communication lines may be terminated. Termination of the communication lines may ensure that the communication lines are available only when the source device requests activation of the communication lines, and therefore, the communication lines cannot be misused by non-authorized users.

In some embodiments, the source device may activate the communication lines in order to receive a communication from the target device.

In some embodiments, the cross-connect tokens may generate a onetime password to connect to another matching cross-connect token. In these embodiments, it may be difficult to activate a communication line without consent from both devices associated with the cross-connect tokens. In this manner, security of the communication lines are established.

In some embodiments, the second cross-connect token included on IoT device 304, may be activated—i.e., enabled to communicate with the second cross-connect token included on IoT device 306—upon the matched connection between the first cross-connect token included on source device 302 and the first cross-connect token included on IoT device 304. In these embodiments, the matched connection between the first cross-connect tokens may generate an instruction and/or trigger a switch within the second crossconnect token included on IoT device 304. When the instruction is generated and/or the switch is triggered, the second cross-connect token included on IoT device 304 may be configured to execute an executable. The executable may include communicating with the second cross-connect token included on IoT device 306. The executable may also include communicating with a network, such as the internet. In some embodiments, IoT device 304 may have previously been prohibited from accessing a network, upon generation of the instruction and/or triggering of the switch, IoT device 304 may be authorized to access the network and/or any other suitable location identified in the instruction or the switch.

Figure 4:
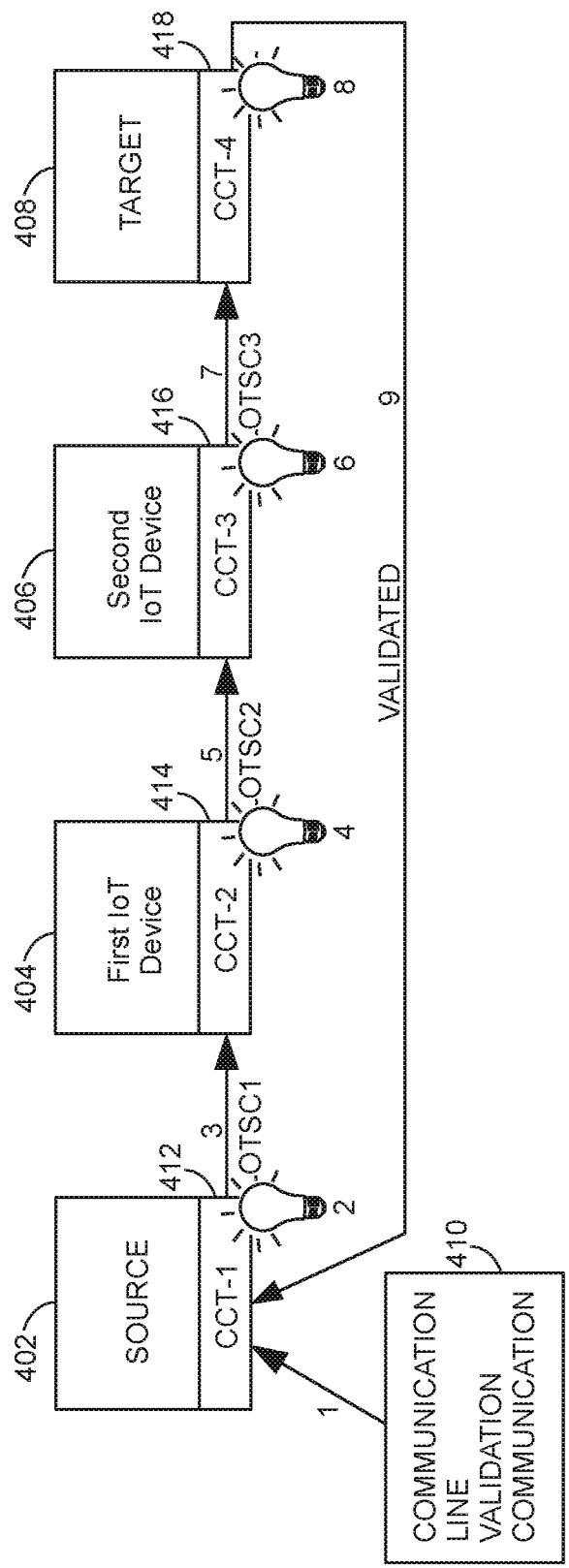
FIG. 4 shows another illustrative diagram in accordance with principles of the invention.

FIG. 4 shows another illustrative diagram. Communication line validation communication 410 may be transmitted to source device 402. Upon receipt of communication line validation communication 410 at source device 402, cross-connect token 412 may become activated. Cross-connect token 412 may be a passive token. Cross-connect token 412 may require external power for activation. Cross-connect token 412 may be powered by the communication line validation communication.

Once cross-connect token 412 becomes activated, cross-connect token 412 may generate and transmit a first onetime security code ("OTSC") to cross-connect token 414. Cross-connect token 414 may be included in first IoT device 404. Upon receipt of the first OTSC at cross-connect token 414, cross-connect token 414 may become activated. Cross-connect token 414 may require external power for activation. The first OTSC may be provide cross-connect token 414 with power. Cross-connect token 414 may be powered by the first OTSC. Cross-connect token 414 may be a passive token.

Once cross-connect token 414 becomes activated, cross-connect token 414 may generate and transmit a second OTSC to cross-connect token 416. Cross-connect token 416 may be included in second IoT device 406. Upon receipt of the second OTSC at cross-connect token 416, cross-connect token 416 may become activated. The second OTSC may provide cross-connect token 416 with power. Cross-connect token 416 may require external power for activation. Cross-connect token 416 may be a passive token.

Once cross-connect token 416 becomes activated, cross-connect token 416 may generate and transmit a third OTSC to cross-connect token 418. Cross-connect token 418 may be included in target device 408. Upon receipt of the third OTSC at cross-connect token 418, cross-connect token 418 may become activated. The third OTSC may provide cross-connect token 418 with power. Cross-connect token 418 may require external power for activation. Cross-connect token 418 may be a passive token.

Once cross-connect token 418 becomes activated, cross-connect token 418 may transmit a validation communication to cross-connect token 412. Upon receipt of the validation communication at cross-connect token 412, source device 402 may transmit a secure communication to target device 408 via the first IoT device and the second IoT device.

Thus, methods and apparatus for an IoT multi-layered embedded handshake have been provided. Persons skilled in the art will appreciate that the present invention can be practiced by other than the described embodiments, which are presented for purposes of illustration rather than of limitation, and that the present invention is limited only by the claims that follow.

What is claimed is:

1. A communications system for securing data transmission utilizing a plurality of cross-connect tokens, the communications system comprising:
   a source device;
   a target device;
   a first IoT device;
   a second IoT device;
   a first cross-connect token for connecting the source device to the first IoT device, said first cross-connect token being stored in whole on the source device, and replicated on the first IoT device;
   a second cross-connect token for connecting the first IoT device to the second IoT device, said second cross-connect token being stored in whole on the first IoT device, and replicated on the second IoT device;
   a third cross-connect token for connecting the second IoT device to the target device, said third cross-connect token being stored in whole on the second IoT device, and replicated on the target device;
   wherein:
   prior to a secure communication transmission from the source device to the target device, the system is configured to execute a ping test for verification of the security of the communication between the source device and the first IoT device, the first IoT device and the second IoT device and the second IoT device and the target device, said ping test initiating communication between:
      the source device and the first IoT device, via a matched connection between the first cross-connect token stored on the source device and the first cross-connect token stored on the first IoT device;
      the first IoT device and the second IoT device, via a matched connection between the second cross-connect token stored on the first IoT device and the second cross-connect token stored on the second IoT device; and
      the second IoT device and the target device, via a matched connection between the third cross-connect token stored on the second IoT device and the third cross-connect token stored on the target device; and
   in response to verification of the security of the communications between the source device and the first IoT device, the first IoT device and the second IoT device and the second IoT device and the target device, the source device is configured to transmit the communication to the target device via the first IoT device and the second IoT device;
   upon completion of the communication being transmitted from the source device to the first IoT device, the matched connection between the first cross-connect token on the source device and the first cross-connect token on the first IoT device is terminated;
   upon completion of the communication being transmitted from the first IoT device to the second IoT device, the matched connection between the second cross-connect token on the first IoT device and the second cross token on the second IoT device is terminated;
   upon completion of the communication being transmitted from the second IoT device to the target device, the matched connection between the third cross-connect token on the second IoT device and the second cross-connect token on the target device is terminated;
   the communication comprises a security parameter; and
   when the security parameter is greater than a security threshold, the system is further configured to, during the transmission of the communication, halt the communication transmission, and terminate the matched connections between:
the first cross-connect token on the source device and the first cross- connect token on the first IoT device;
the second cross-connect token on the first IoT device and the second cross-connect token on the second IoT device; and
the third cross-connect token on the second IoT device and the third cross-connect token on the target device.

2. The system of claim 1, wherein the system is further configured to re-execute the ping test and, upon successful completion of the re-executed ping test, continue the communication transmission.

3. The system of claim 1, wherein the first IoT device and/or the second IoT device is a human-wearable device.

4. The system of claim 1, wherein the source device and/or the target device are IoT devices.

5. The system of claim 1, wherein the second cross-connect token, included on the first IoT device, is activated upon the matched connection between the first cross-connect token included on the source device and the first cross-connect connect token included on the first IoT device.

6. The system of claim 5, wherein the matched connection between the first cross-connect token on the source device and the first cross-connect token on the first IoT device, generates an instruction within the second cross-connect token included on the first IoT device.

7. The system of claim 6, wherein an executable is executed upon generation of the instruction, said executable comprising the second cross-connect token, included on the first IoT device, accessing a network that the first IoT device was previously prohibited from accessing.

8. A communications system for securing data transmission utilizing a plurality of cross-connect tokens, the communications system comprising:
a source device;
a target device;
a first IoT device;
a second IoT device;
a first cross-connect token for connecting the source device to the first IoT device, said first cross-connect token being stored in whole on the source device, and replicated on the first IoT device;
a second cross-connect token for connecting the first IoT device to the second IoT device, said second cross-connect token being stored in whole on the first IoT device, and replicated on the second IoT device;
a third cross-connect token for connecting the second IoT device to the target device, said third cross-connect token being stored in whole on the second IoT device, and replicated on the target device;
wherein:
prior to a secure communication transmission from the source device to the target device, the system is configured to execute a ping test for verification of the security of the communication between the source device and the first IoT device, the first IoT device and the second IoT device and the second IoT device and the target device, said ping test initiating communication between:
the source device and the first IoT device, via a matched connection between the first cross-connect token stored on the source device and the first cross-connect token stored on the first IoT device;
the first IoT device and the second IoT device, via a matched connection between the second cross-connect token stored on the first IoT device and the second cross-connect token stored on the second IoT device; and
the second IoT device and the target device, via a matched connection between the third cross-connect token stored on the second IoT device and the third cross-connect token stored on the target device; and
in response to verification of the security of the communications between the source device and the first IoT device, the first IoT device and the second IoT device and the second IoT device and the target device, the source device is configured to transmit the communication to the target device via the first IoT device and the second IoT device;
upon completion of the communication being transmitted from the source device to the first IoT device, the matched connection between the first cross-connect token on the source device and the first cross-connect token on the first IoT device is terminated;
upon completion of the communication being transmitted from the first IoT device to the second IoT device, the matched connection between the second cross-connect token on the first IoT device and the second cross token on the second IoT device is terminated; and
upon completion of the communication being transmitted from the second IoT device to the target device, the matched connection between the third cross-connect token on the second IoT device and the second cross-connect token on the target device is terminated;
the second cross-connect token, included on the first IoT device, is activated upon the matched connection between the first cross-connect token included on the source device and the first cross-connect connect token included on the first IoT device; and
the matched connection between the first cross-connect token on the source device and the first cross-connect token on the first IoT device, triggers a switch within the second cross-connect token included on the first IoT device.

9. The system of claim 8, wherein an executable is executed upon triggering of the switch, said executable comprising the second cross-connect token, included on the first IoT device, accessing a location that the first IoT device was previously prohibited from accessing.

* * * * *